(12) United States Patent
Molaro

(10) Patent No.: US 7,278,165 B2
(45) Date of Patent: Oct. 2, 2007

(54) METHOD AND SYSTEM FOR IMPLEMENTING DIGITAL RIGHTS MANAGEMENT

(75) Inventor: Donald Joseph Molaro, Sunnyvale, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 737 days.

(21) Appl. No.: 10/391,718

(22) Filed: Mar. 18, 2003

(65) Prior Publication Data

US 2004/0187014 A1 Sep. 23, 2004

(51) Int. Cl.
*H04L 9/00* (2006.01)
*H04N 7/167* (2006.01)

(52) U.S. Cl. .................. 726/27; 726/31; 380/201; 380/229; 380/230; 380/242; 705/51

(58) Field of Classification Search ............... 726/27, 726/28, 31; 380/201, 203, 229, 230, 242
See application file for complete search history.

(56) References Cited

U.S. PATENT DOCUMENTS

| | | | |
|---|---|---|---|
| 6,550,011 B1* | 4/2003 | Sims, III ................ 713/193 |
| 6,920,567 B1* | 7/2005 | Doherty et al. ........... 726/22 |
| 7,020,704 B1* | 3/2006 | Lipscomb et al. ........ 709/226 |
| 2002/0019814 A1 | 2/2002 | Ganesan ................... 705/59 |
| 2002/0046181 A1 | 4/2002 | Story, Jr. et al. .......... 705/59 |
| 2003/0078891 A1 | 4/2003 | Capitant ................... 705/57 |
| 2004/0168056 A1 | 8/2004 | Dillaway et al. .......... 713/156 |
| 2004/0171533 A1 | 9/2004 | DeMello et al. .......... 713/164 |
| 2007/0073694 A1* | 3/2007 | Picault et al. .............. 707/9 |
| 2007/0079380 A1* | 4/2007 | Kawaguchi et al. ........ 726/26 |
| 2007/0089151 A1* | 4/2007 | Moore et al. ............. 725/132 |
| 2007/0089174 A1* | 4/2007 | Bader et al. ............... 726/32 |

FOREIGN PATENT DOCUMENTS

EP 001045388 A1 * 10/2000
EP 001712978 A2 * 10/2006

OTHER PUBLICATIONS

Mendes et al, A New Approach to the X.509 Framework: Allowing a Global Authentication Infrastructure without a Global Trust Model, 1995, IEEE, pp. 172-189.*
Lingyun et al, Incremental Learning of Decision Rules Based on Rough Set Theory, 2001, IEEE, pp. 420-425.*
Geer, David, Digital Rights Technology Sparks Interoperability Concerns, 2004, IEEE, pp. 20-22.*

* cited by examiner

*Primary Examiner*—Ayaz Sheikh
*Assistant Examiner*—Aravind K Moorthy

(57) ABSTRACT

In one embodiment, a content license is created that defines parameters for accessing a piece of digital content. A first logical expression in the content license defines a plurality of playback devices that are authorized to access the piece of digital content. A second logical expression in the content license defines at least one time interval when the plurality of playback devices are authorized to access the piece of digital content. The content license is used to access the piece of digital content.

25 Claims, 12 Drawing Sheets

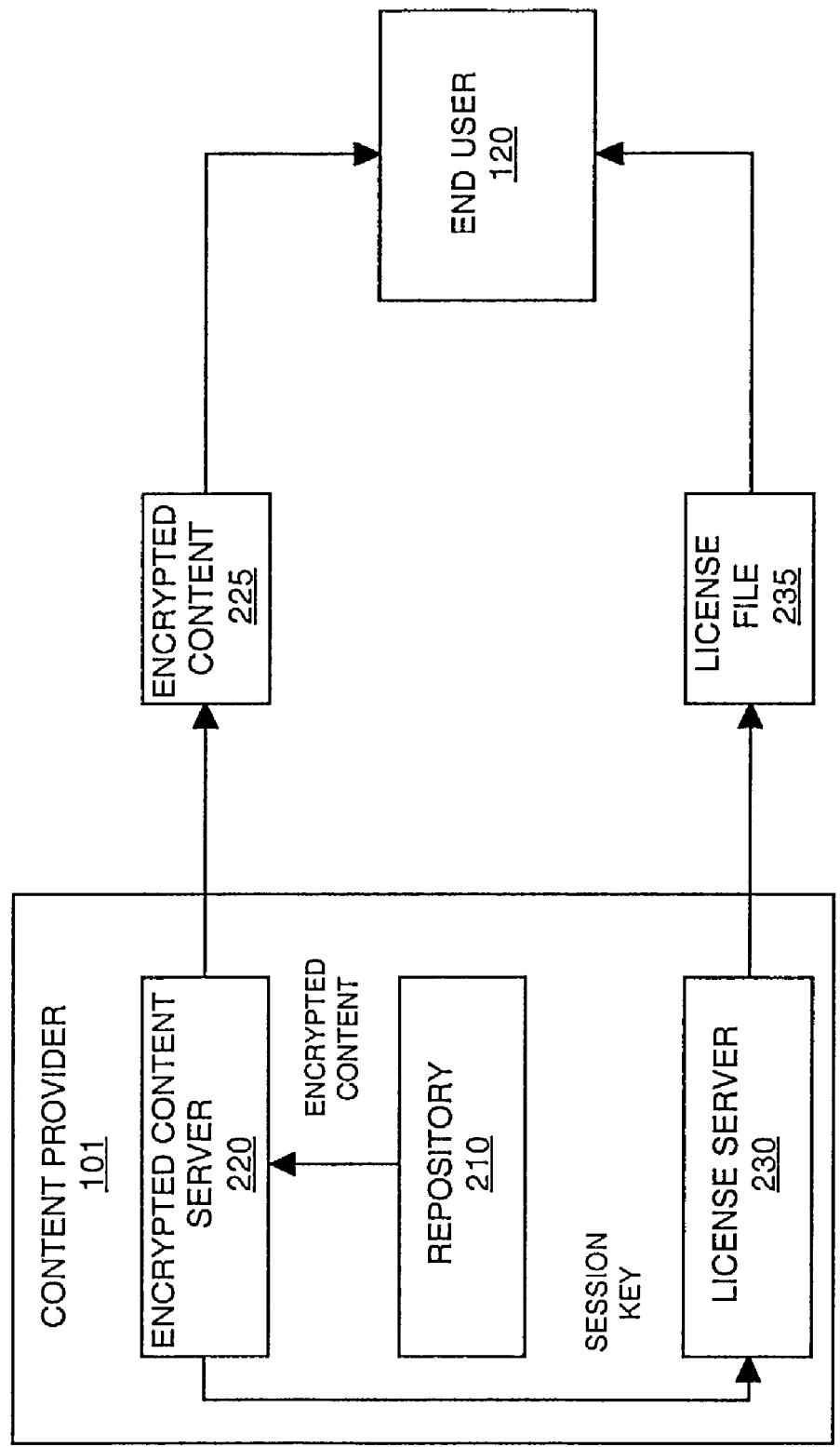

400 FIGURE 4
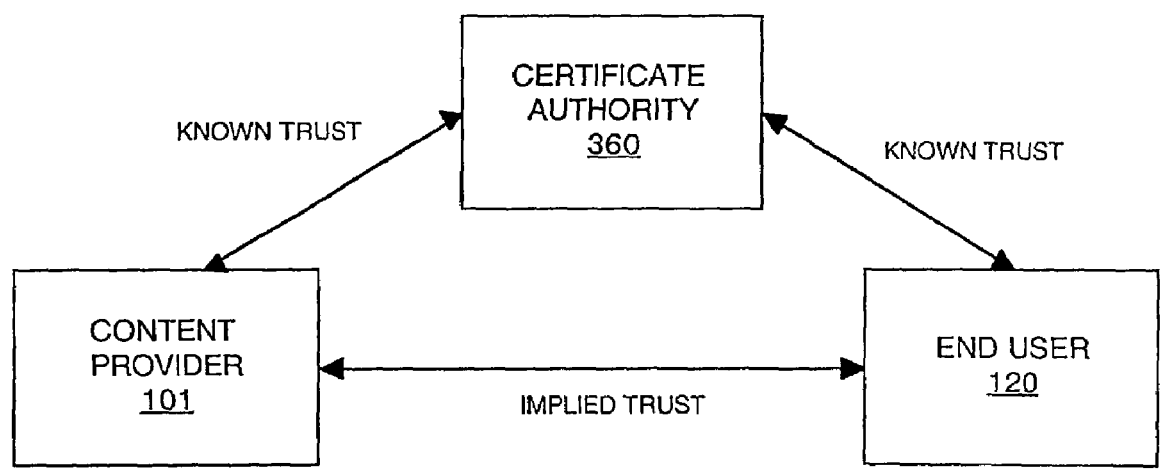

700   FIGURE 7

METHOD AND SYSTEM FOR IMPLEMENTING DIGITAL RIGHTS MANAGEMENT

FIELD OF THE INVENTION

The present invention relates to the field of digital content distribution. More specifically, embodiments of the present invention are directed to implementing digital rights management.

BACKGROUND OF THE INVENTION

The Internet is increasingly being used as a distribution medium for entertainment content such as movies, music, or other multi-media presentations. At one time, it was predicted that a user would be able to order digital content (e.g., a movie) over the Internet and have it streamed in real-time to their computer. However, systems having sufficient computing capacity to provide an acceptable level of real-time streaming video performance have proven to be too expensive for most users. Additionally, Internet capacity for providing wide scale delivery of streaming video content is, at this time, insufficient. In order to allow distribution of digital content over the Internet, content providers typically rent the content to end users for a specified time period and allow the end users to store the content upon their personal computers so that they can access the digital content later.

Unfortunately, this system facilitates unauthorized distribution of copies of copyrighted material. For example, a user can easily copy the digital content and inappropriately distribute it over the Internet. This could potentially cause copyright holders to lose revenue. Recent court cases show that the entertainment industry is intent upon preventing unauthorized access and copying of their property. At the same time, they want to facilitate distribution of their content to as wide an audience as possible. Therefore, copyright holders are looking for methods of delivering high quality content over the Internet that still protect their copyright privileges.

Currently, there are two predominant digital content protection models that are used in the distribution of video content (e.g., television programming or movie distribution), conditional access (CA) and digital rights management (DRM). Conditional access (CA) is a technology that is mainly used to control access to digital programming to authorized users by encrypting the transmitted programming. Conditional Access has been used for years for pay-per-view broadcasts of live content (e.g., sports events, etc.) that is encrypted and broadcast to end users and selectively decrypted at the end user's site using a set-top box.

FIG. 1 is a diagram of an exemplary prior art Conditional Access system 100. In FIG. 1, a content provider 101 transmits digital content to end users (e.g., end users 120, 121, 123, and 124 of FIG. 1) via broadcast network 150. The digital content is encrypted at the uplink site (e.g., site 110) using a previously chosen encryption key. Distribution of the keys for decrypting the digital content is typically accomplished by sending smart card storage devices containing the decryption keys to the end users. The smart card is inserted into the end user's set-top box (not shown) and thus enables the end user to decrypt the digital content. For example, the set-top box filters out the broadcast signals and decrypts them using the decryption key stored on the smart card. The decrypted signal is then decoded and output to the end users' television.

Many users may find the CA model inconvenient because of the delay involved in delivering the decryption key to the end user. Furthermore, to deliver streaming content over the Internet, there must be a continuous high bandwidth link between the end user and content provider which may be difficult to maintain for the duration of the content broadcast.

FIG. 2 is a block diagram of an exemplary prior art DRM system 200. DRM technology addresses the need for protecting file distribution. DRM has emerged as a set of technologies and business models to protect digital media copyrights and to provide revenue to content owners. In FIG. 2, repository 210 holds the content offered for distribution by content provider 101. When a user orders a file or other digital content (e.g., a movie) the content is sent from repository 210 to encrypted content server 220. Encrypted content server 220 packages the content for distribution to the end users by encrypting the requested content with a session key that is sent from encrypted content server 220 to license server 230. License server 230 maintains a license file 235 containing the session key and a description of the usage rules associated with the requested content. End user 120 receives encrypted content file 225, which they can store upon their computer, and communication is established with license server 230 to verify access rights to the encrypted content and obtain the session key for decrypting the content file. Once access rights have been verified, end user 120 can access the requested content.

There are a variety of problems associated with the DRM system as described. For example, the license, describing the usage rules associated with the digital content, describes a one-to-one relationship in which a specific piece of digital content can be accessed by a designated playback device during a specified time interval. This is inconvenient for many users who, having more than one television, may wish to access the content using multiple playback devices. Thus, a user may wish to begin watching a piece of digital content (e.g., a movie) in their living room, and finish watching it later in the night in their bedroom on a second television. However, the license associated with the digital content only allows the movie to be played one specific device, for example, the television in the living room, and only within a single specified time period.

Currently, a user wanting to watch the same piece of digital content on multiple television sets is required to obtain multiple licenses for that piece of digital content. Thus, a first license, associated with a first copy of the digital content, is obtained allowing the end user to watch the digital content on the television in their living room. A second license, associated with a second copy of the same digital content, is obtained allowing the end user to watch the digital content in their bedroom. This system is inconvenient to the end users because they have to obtain multiple licensed copies of the content. Additionally, the users have to determine which copy of the digital content can be played upon a given television set. This system is also inconvenient and expensive for the content providers because they need to send multiple copies of the same content to the same user. Thus, the content providers cannot use their bandwidth to serve other end users while the multiple copies are being sent.

SUMMARY OF THE INVENTION

Accordingly, a need exists for a method and system that facilitates delivery of high quality digital content to an end user without necessitating a continuous communications link between a user and a content provider. An additional need exists for a method and system that, while meeting the above stated need, allows the end user to access the digital content in a more convenient manner. More specifically, a need exists for a method that allows a user to access digital content upon a plurality of playback devices and/or at a plurality of time intervals using a single content license. Furthermore, while meeting the above stated needs, it is desirable that such a method and system includes security measures to protect against unauthorized copy and distribution of the digital content.

In one embodiment of the present invention, a content license is created that defines the parameters for accessing a piece of digital content. A first logical expression in the content license defines a plurality of playback devices that are authorized to access the piece of digital content. A second logical expression in the content license defines at least one time interval when the plurality of playback devices are authorized to access the piece of digital content. In another embodiment of the present invention, the second logical expression defines a plurality of time intervals when the piece of digital content can be accessed by at least one playback device.

The following example shows how an embodiment of the present invention may be used to implement digital rights management. An end user orders a piece of digital content to be downloaded via the Internet from a content provider. The end user identifies a plurality of playback devices with which they would like to access the digital content and a time or times when they would like to access the digital content.

A trust relationship is established using a certificate authority to verify the identity of each of the playback devices the end user will use to access the digital content. In embodiments of the present invention, each playback device is also identified using a Silicon Identification number (SID), Media Access Control (MAC) address, or the like. The SID each of the playback devices that will access the digital content are included in the content license to prevent accessing the piece of digital content on an unauthorized playback device.

The content provider creates a content license that is used by the end user to access the digital content. The content license describes the parameters for accessing the digital content. In embodiments of the present invention, these parameters are expressed using a logical expression such as a Boolean statement. Using a logical expression to describe these parameters allows the inclusion of multiple playback devices and/or multiple playback times into a single content license. In embodiments of the present invention, the content license defines the piece of digital content, the playback devices authorized to access the piece of digital content, and the time interval(s) that the playback devices are authorized to access the piece of digital content. Embodiments of the present invention can also be used to restrict the access by a particular playback device to a specific time period.

The encrypted piece of digital content is delivered to the end user. When the end user tries to access the piece of digital content, the playback device downloads the content license to enable access. A file is included in the content license that is encrypted using the public key of the playback device accessing the digital content. This encrypted file contains the keys needed to decrypt the digital content. Using its private key, the playback device decrypts this file, obtains the keys for decrypting the digital content, and begins playback of the digital content.

Thus, embodiments of the present invention protect the copyright privileges of the content provider while facilitating greater convenience and flexibility for the end user.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

FIG. 2 is a block diagram of an exemplary prior art Digital Rights Management (DRM) digital content protection model.

FIG. 4 is a diagram of an exemplary trust model used in accordance with embodiments of the present invention.

DETAILED DESCRIPTION OF THE PREFERRED EMBODIMENT

Reference will now be made in detail to the preferred embodiments of the present invention, examples of which are illustrated in the accompanying drawings. While the present invention will be described in conjunction with the preferred embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "creating," "including," "defining," "verifying," "associating," "including," "accessing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
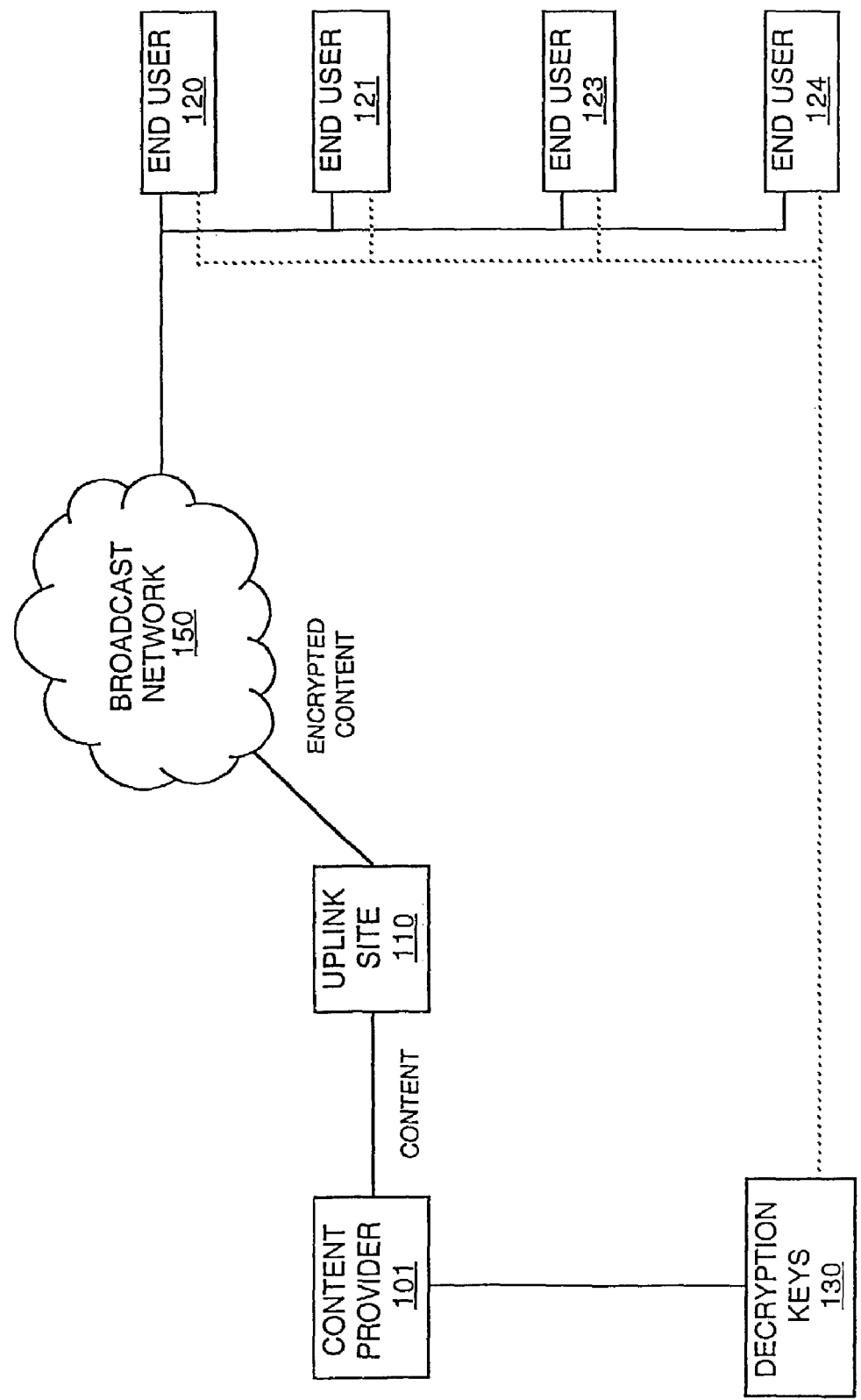
FIG. 1 is a block diagram of an exemplary prior art Conditional Access (CA) digital content protection model.
Figure 3A:
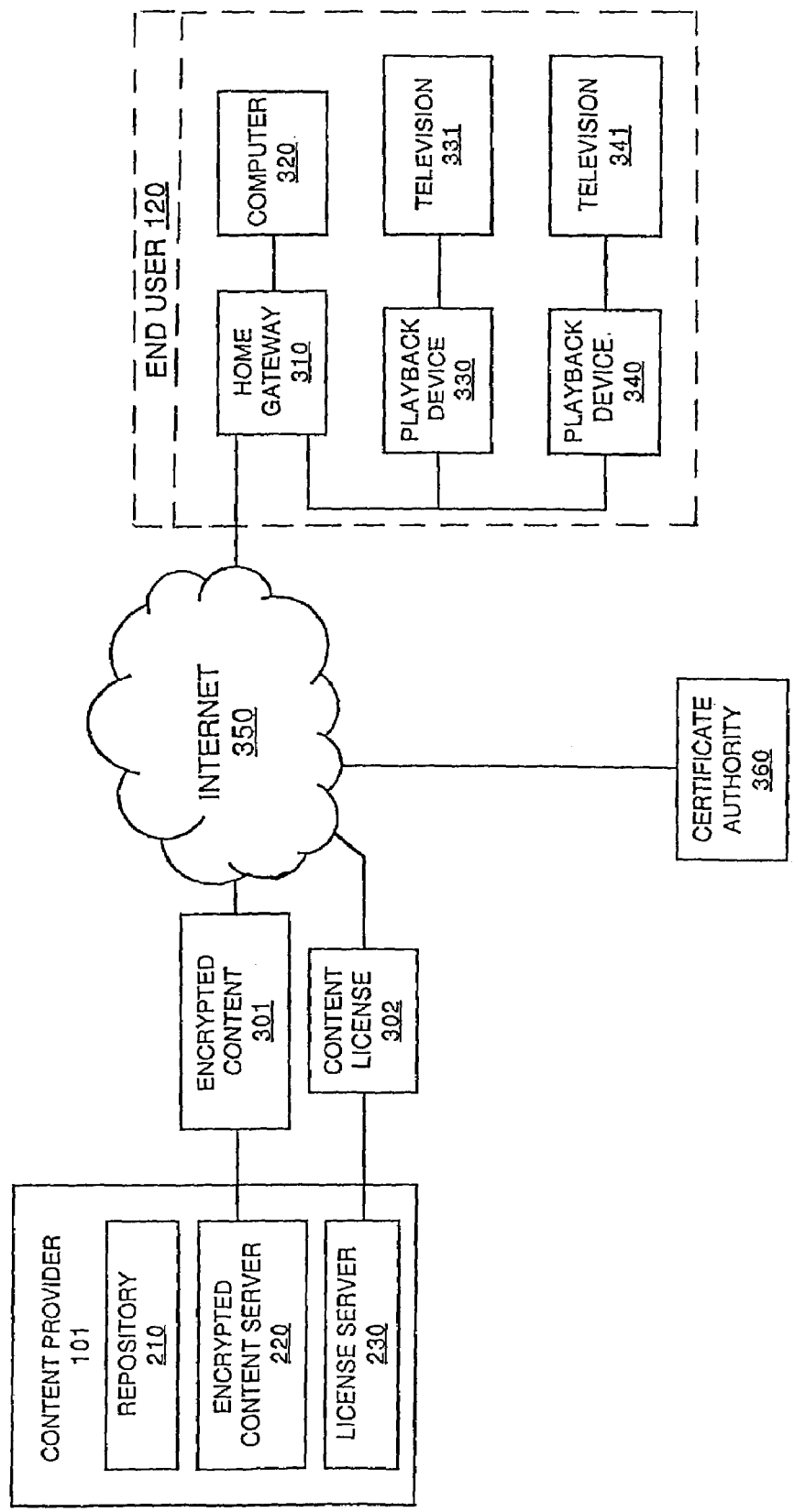
FIG. 3A is a diagram of an exemplary model for distributing digital content in accordance with embodiments of the present invention.

FIG. 3A is a diagram of an exemplary model 300 for distributing digital content in accordance with one embodiment of the present invention. In the embodiment of FIG. 3A, end user 120 is coupled with Internet 350 using a home gateway 310. In embodiments of the present invention, a broadband connection is used to communicatively couple home gateway 310 with Internet 350. There are a variety of commercially available home gateway devices that are used to couple home computer networks with broadband Internet connections and may be used in embodiments of the present invention. Similarly, home computer 320 may be a personal computer or a dedicated home server system for storing digital content. Home gateway 310 is further coupled with a plurality of playback devices 330 and 340. In the embodiment of FIG. 3A, playback devices 330 and 340 are coupled with televisions 331 and 341 respectively and facilitate playback of downloaded digital television programming.

Figure 3B:
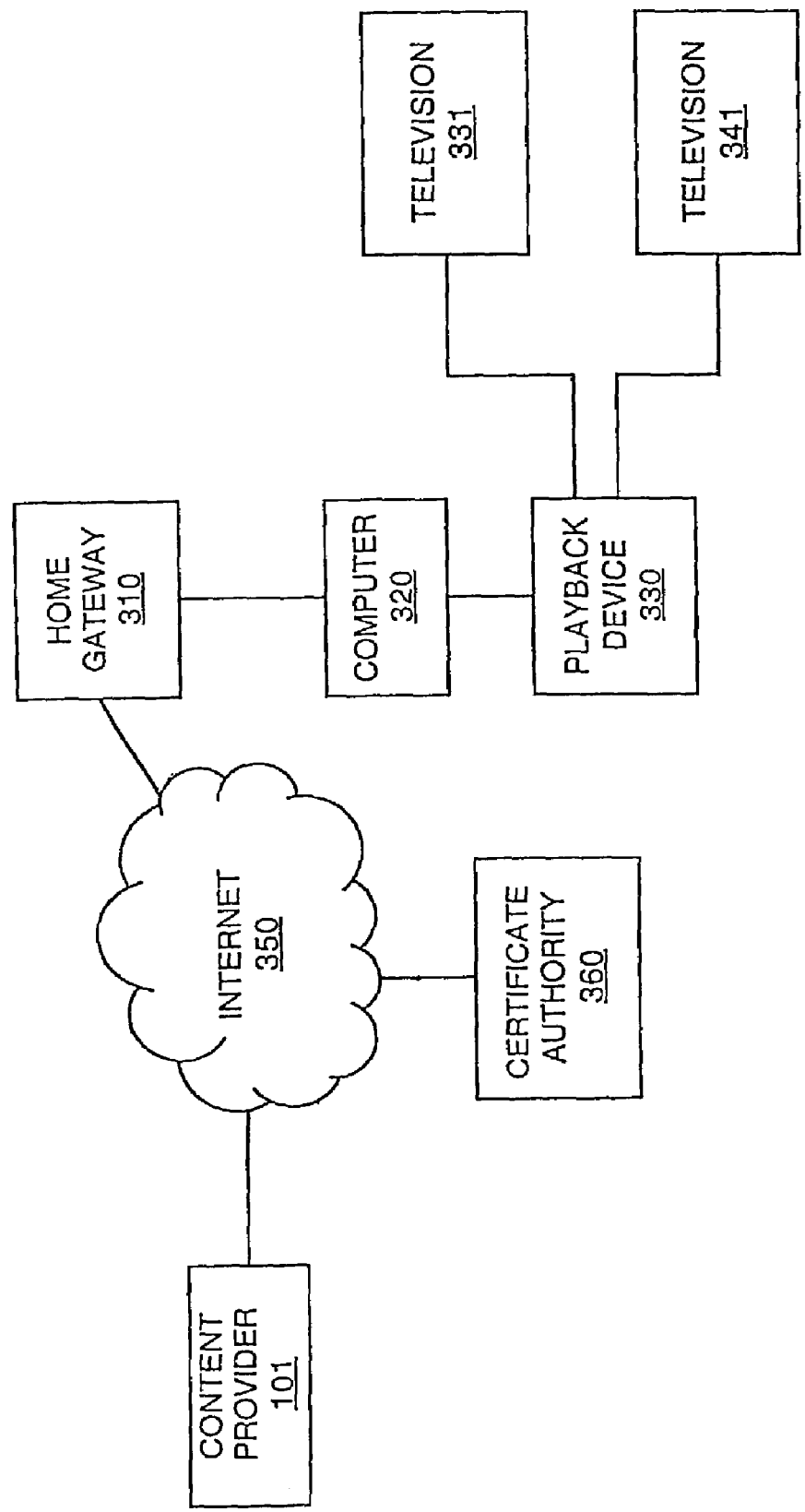
FIG. 3B is a diagram of an exemplary model for distributing digital content in accordance with another embodiment of the present invention.

FIG. 3B is a diagram of an alternative implementation for distributing digital content in accordance with embodiments of the present invention. In FIG. 3B, computer 320 couples home gateway 310 with a single playback device 330. Playback device 330 is also coupled with televisions 331 and 341.

In embodiments of the present invention, playback devices 330 and 340 are dedicated set-top boxes for accessing the digital content stored upon home computer 320, decrypting and decoding it, and outputting it to televisions 331 and 341 respectively. It is appreciated that in other implementations of the present invention, digital content may comprise other media types than television programming such as, for example, music or other programming. In other embodiments of the present invention, playback devices 330 and 340 may be integrated into televisions 331 and 341 respectively. For example, playback device 330 may comprise a circuit board that is built into television 331.

Referring again to FIG. 3A, in embodiments of the present invention, a unique identification, referred to as a silicon identification number (SID) is associated with each of the playback devices (e.g., playback devices 330 and 340 of FIG. 3A) that end user 120 will use to playback encrypted content 301. In one embodiment, an integrated circuit chip similar to a media access control (MAC) address chip is used to uniquely identify each playback device. The SID is included in content license 302 to facilitate defining playback devices used by end user 120 that are authorized to access a piece of digital content sent by content provider 101. This makes unauthorized access of the piece of digital content more difficult because unless the playback device is identified using the correct SID, access to the piece of digital content is not allowed.

In embodiments of the present invention, a trust relationship is established between end user 120 and content provider 101. An explanation of an exemplary trust relationship is described in greater detail in the following discussion of FIG. 4.

FIG. 4 is a diagram of an exemplary trust model 400 used in accordance with embodiments of the present invention. In embodiments of the present invention, trust relationship is established between end user 120 and content provider 101 before a content license is created by content provider 101. For example, in FIG. 4 certificate authority 360 establishes a known trust with both content provider 101 and end user 120. This in turn establishes an implied trust between content provider 101 and end user 120. In embodiments of the present invention, a digital certificate compliant with the X.509 standard is used by certificate authority 360 to establish trust between end user 120 and content provider 101.

Digital certificates are digital documents issued by a certificate authority (e.g., certificate authority 360 of FIG. 4) that establish the credentials of entities doing business or other transactions on the Internet. The digital certificate attests to the binding of a public key, used for encrypting messages and digital signatures, to an individual or other entity. They typically contain the certificate holder's name, a certificate serial number, expiration dates, a copy of the certificate holder's public key, and the digital signature of the certificate-issuing authority so that a recipient can verify that the certificate originated from a trusted party. Digital certificates can be kept in registries so that trusted users can look up other users' public keys.

In embodiments of the present invention, each playback device used by end user 120 is issued a separate digital certificate. For example, playback devices 330 and 340 may be provided with a signed digital certificate when they are manufactured. Each of these digital certificates may also contain the SID of the particular playback device being verified by the certificate authority. This allows content provider 101 to verify the identity of each playback device used by end user 120 and include this information in the content license (e.g., content license 302) associated with encrypted content 301. As stated above, digital certificates can be kept in registries so that authenticating users can look up the other users' public keys. Thus, in embodiments of the present invention, content provider 101 maintains a database for associating the digital certificates each of the playback devices that user 120 will use to access encrypted content 301. This database includes, for example, the public key of playback device 330 and of playback device 340 as well.

Figure 5:
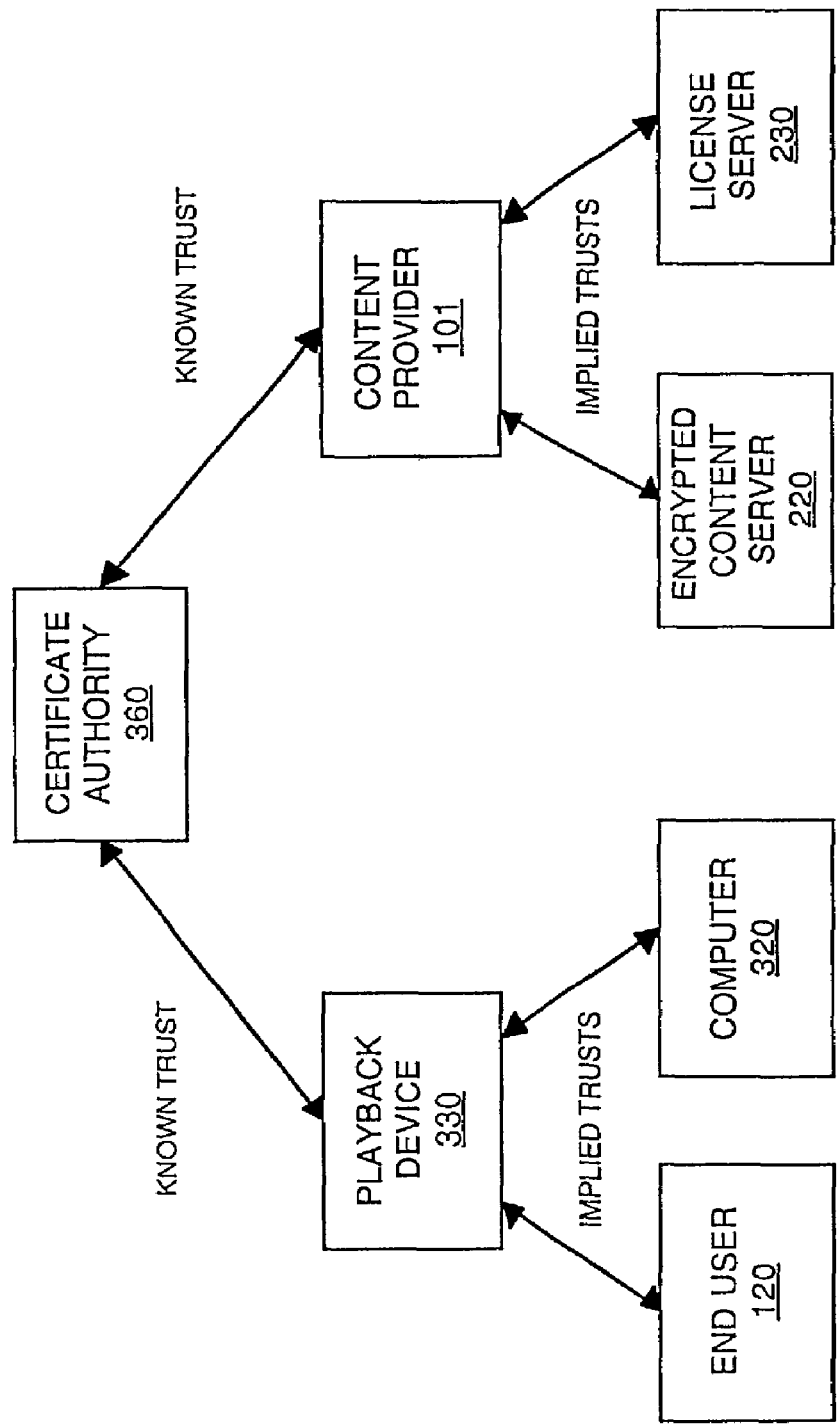
FIG. 5 is a diagram of trust relationships created in an exemplary DRM system in accordance with embodiments of the present invention.

FIG. 5 is a diagram of trust relationships created in an exemplary DRM 500 system in accordance with embodiments of the present invention. In FIG. 5, a known trust is established between content provider 101 and, for example, playback device 330. As stated above, playback device 330 may be manufactured with a signed digital certificate. When playback device 330 is initially coupled with home gateway 310, a set-up routine may be used that creates implied trusts with computer 320 and end user 120 via the known trust established between playback device 330 and certificate authority 360. This also creates an implied trust between playback device 330 and encrypted content server 220 and license server 230. This facilitates preventing unauthorized access of a piece of digital content because content provider 101 will not send a piece of digital content to untrusted playback devices. While the present embodiments of establishing trust have been specifically recited, the present invention is well suited for utilizing a variety of methods for verifying identities and establishing trust relationships.

Referring again to FIG. 3A, when end user 120 orders a piece of digital content, either directly from content provider 101 or via a trusted third party (e.g., a cable television service provider), content provider 101 first determines that the piece of digital content will be played upon a trusted playback device. As discussed above, content provider 101 may maintain a registry of trusted playback devices that includes the public key of each of the trusted playback devices. End user 120 typically specifies the piece of digital content being ordered, the playback device(s) that will be used to access the piece of digital content, and time period(s) during which the piece of digital content will be accessed.

Once content provider 101 determines that the piece of digital content is to be accessed by a trusted playback device, the piece of digital content is sent from repository 210 to encrypted content server 220. The piece of digital content is encrypted using an approved algorithm such as the Advanced Encryption Standard (AES). The AES is an encryption standard in which data is encrypted using a symmetric key block cipher, which is a type of cipher that encrypts data in blocks, rather than a single bit at a time, and uses the same key for both encryption and decryption. In embodiments of the present invention, the key used to encrypt the piece of digital content is randomly changed at intervals of approximately 1.6 megabytes. Thus, a sequence of keys are used to encrypt the piece of digital content. The key sequence is sent from encrypted content server 220 to license server 230. License server then creates content license 302 comprising a description of the access rights a user has to the piece of digital content and the key sequence for decrypting the digital content. In one embodiment of the present invention, the key sequence used to encrypt the digital content is encrypted using the public key of the playback device that accesses the piece of digital content. While the present embodiment recites using a symmetric key sequence for encrypting digital content, the present invention is well suited to using an asymmetric key encryption as well.

In one embodiment of the present invention, a separate content license may be created for each playback device that is authorized to access the piece of digital content and maintained on license server 230. Each license contains a description of the piece of digital content, the playback devices authorized to access the piece of digital content, and the time or times that each of the playback devices is authorized to access the piece of digital content. Each license also contains the key sequence of the digital content that is further encrypted using the public key of one of the authorized playback devices. Thus in FIG. 3A, content license 302 comprises one copy of the key sequence that is encrypted using the public key of playback device 330. A second content license 302 comprises a second copy of the same key sequence that is encrypted using the public key of playback device 340. In this implementation, content license 302 may be entirely encrypted using the public key of the playback device obtaining the content license.

In another embodiment, a single license may be maintained on license server 230 containing a description of the piece of digital content, the playback devices authorized to access the piece of digital content, and the time or times that each of the playback devices is authorized to access the piece of digital content. Additionally, multiple copies of the key sequence are contained in the content license, each of which is further encrypted using the public key of one of the authorized playback devices. Referring again to FIG. 3A, content license 302 comprises one copy of the key sequence that is encrypted using the public key of playback device 330, and a second copy of the same key sequence that is encrypted using the public key of playback device 340.

In the present invention, content license 302 is a logical expression defining parameters for accessing a piece of digital content (e.g., encrypted content 301). In one embodiment, a Boolean expression may be used to describe the access rights an end user has to a piece of digital content. It is appreciated that the logical expressions used to define access parameters in content license 302 may utilize other forms of logic statements than a Boolean statement In another implementation, a mathematical statement may be used to describe the access rights of the end user. Additionally, it is appreciated that other parameters may be expressed in content license 302. For example, a Motion Picture Association of America (MPAA) rating may be used as an access parameter. Playback device 330 may be configured such that it cannot access a piece of digital content having an MPAA rating of PG-13 or higher.

Some DRM systems utilize the extensible rights mark-up language (XRML) to define the rules for accessing a piece of digital content. Because XRML is a declarative language, the description of access rights does not allow a decision making process to occur. Therefore, a content license in a conventional DRM system describes a single piece of digital content, a single playback device authorized to access the digital content, and a single time interval in which the authorized playback device could access the piece of digital content. However, this does not allow sufficient flexibility for end users who may want to access the piece of digital content from more than one television in their house or at different times. With a conventional DRM system in which each license can only represent a single period, this is not an achievable goal.

Because embodiments of the present invention utilize logical expressions in content license 302, a plurality of time intervals and playback devices can be included in a single content license using logical operators such as the Boolean operators "AND," "OR," "NOT," "NOR," "NAND," "XOR," etc., or mathematical operators such as "<," ">" "+," "-," "=," "≠," ect. For example, the following exemplary expression can be used to describe three playback devices that are authorized to access a piece digital content during a designated time interval:

(<SID1>:<T1>:<T2>) OR (<SID2>:<T1>:<T2>) OR (<SID3>:<T1>:<T2>)

In the above example, the three playback devices are identified using their silicon identification numbers (e.g., SID1, SID2, and SID3) and the time interval is defined as having a start time T1 and an ending time T2. Using logical statements to define access parameters also allows more complex expressions such as:

(<SID1>:<T1>:<T2>AND<T3>:<T4>) OR (<SID2>:<T4>:<T5>AND<T6>:<T7>)

In the above example, two playback devices are identified by their SID number and four different time intervals are defined in which the piece of digital content can be accessed.

Additionally, embodiments of the present invention may utilize logical expressions which define access parameters using both mathematical operators and Boolean operators. For example, in the following expression, time intervals for accessing a piece of digital content are defined in a Boolean expression in which the operands are defined using mathematical operators.

((NOW>START1) AND (NOW<END1)) OR ((NOW>START2) AND (NOW<END2))

In the above example, ((NOW>START1) AND (NOW<END1)) and ((NOW>START2) AND (NOW<END2)) represent two distinct validity periods that may be included in a single content license. In another embodiment, the validity periods may be expressed as a start time plus the length of the validity period. For example, the authorized time for accessing digital content may be expressed as (T1+8 hours). While the previous examples comprise logical operators, it is not required that the logical expression defining access parameters uses logical operators. For example, in one embodiment the logical expression uses set theory to define access parameters.

D=SID∈{DeviceA, DeviceB}

I=NOW ∈{(START1,END1), (START2,END2), (START3,END3)}

R=D×I

As stated above, a content license used in embodiments of the present invention comprises a logical expression defining the parameters for accessing a piece of digital content and a key sequence for decrypting the piece of digital content. Thus, an exemplary content license of the present invention may be expressed as follows:

---
DOCUMENT
    OPTIONS
    END OPTIONS
    IDENTIFICATION
    END IDENTIFICATION
    RIGHTS
        (((SID=DEVICEA) AND
        (((NOW > START1) AND (NOW < END1)) OR
        ((NOW > START2) AND (NOW < END2)) OR
        ((NOW > START3) AND (NOW < END3)) OR
        ((NOW > START4) AND (NOW < END4)) OR
        ((NOW > START5) AND (NOW < END5)) OR
        ((NOW > START6) AND (NOW < END6)))) OR
        (SID=DEVICEB) AND
        (((NOW > START7) AND (NOW < END7)) OR
        ((NOW > START8) AND (NOW < END8)) OR
        ((NOW > START9) AND (NOW < END9)) OR
        ((NOW > START10) AND (NOW < END10)) OR
        ((NOW > START11) AND (NOW < END11)) OR
        ((NOW > START12) AND (NOW < END 12)))))
    END RIGHTS
    KEYS
        KEY 1
        KEY 2
        KEY 3
        KEY 4
        KEY 5
        KEY 6
        KEY 7
        KEY 8
        KEY 9
        KEY 10
    END KEYS
END
---

In the exemplary content license above, the options field may be used to include additional features into the content license. For example, an MPAA rating may be included in this field. The identification field may comprise the title of the piece of digital content and other information for end user 120 such as a summary of the access rights to the piece of digital content. Access parameters for DEVICEA are defined in the rights field which lists 6 separate time intervals in which DEVICEA can access the piece of digital content. Additionally, the rights for DEVICEB are defined in the rights field which lists 6 additional time intervals in which DEVICEB can access the piece of digital content. The keys field comprises the key sequence used to encrypt the digital content at encrypted content server 220. This key sequence is then encrypted using the public key of the playback devices accessing the digital content.

Returning now to FIG. 3A, copy of encrypted content 301 is sent to computer 320 via Internet 350. When user 120 attempts to access encrypted content 301 using, for example, playback device 330, playback device 330 connects with license server 230 via Internet 350 and home gateway 310 and obtains a copy of the content license 302. As stated above, a portion of content license 302 comprises a sequence of keys that can be used to decrypt the piece of digital content. This sequence of keys was encrypted using the public key of playback device 330. Upon obtaining a copy of the playback license, playback device 330 decrypts the sequence of keys using its private key.

Playback device 330 now has a copy of the content license that describes the parameters for accessing encrypted content 301 as well as a decrypted copy of the key sequence used to encrypt the piece of digital content. If the parameters of content license 302 authorize playback device 330 to access the piece of content at that particular time, playback device 330 connects with computer 320 using home gateway 310 to access the piece of encrypted digital content. As the encrypted content is received by playback device 330, the key sequence is used to decrypt the digital content, which is then decoded by playback device and output to television 331.

In embodiments of the present invention, the output to television 331 is an analog signal to prevent a decrypted version of the digital content from being accessed by end user 120. Additionally, the output from the playback devices may be encoded using Macrovision™. Macrovision™ protects copyright holders from unauthorized recording of programming from videocassettes, digital Pay-Per-View (PPV) programs and Digital Video Discs (DVDs), etc. to videocassette.

If end user 120 decides to watch encrypted content 301 on television 341, a similar process is initiated to determine whether playback device 340 is authorized to access the digital content. For example, playback device 340 contacts license server 230 to obtain copy of content license 302. A copy of content license 302 is encrypted using the public key associated with the digital certificate of playback device 340. Content license 302 is decrypted and, if authorized, encrypted content 301 is accessed from computer 320. The encrypted digital content is then decrypted and decoded by playback device 340 and output to television 341.

In embodiments of the present invention, in order to reduce the possibility of an end user gaining unlimited access to a piece of digital content, each of the playback devices may synchronize its clock with a trusted entity, for example, either license server 230 or certificate authority 360. In embodiments of the present invention, a distributed clock algorithm can be sent to the playback device that provides a substantially secure and monotonically increasing notion of time on the playback device that can be updated on a regular basis. This prevents an end user from resetting their clock to an earlier time in order to continue accessing the piece of digital content. For example, by constantly resetting the clock on either computer 320 or playback device 330, a user may try to deceive the system into allowing access to the digital content after the content license has expired. By synchronizing the clock on the playback devices and/or computer 320 with a trusted entity, the opportunity for this type of security breach is reduced. Additionally, in embodiments of the present invention, content license 302 may be streamed in real time rather than stored upon playback device 330 to prevent unauthorized access to the digital content. This limits access to the decryption key to only the time periods in which encrypted content 301 is being accessed.

Figure 6:
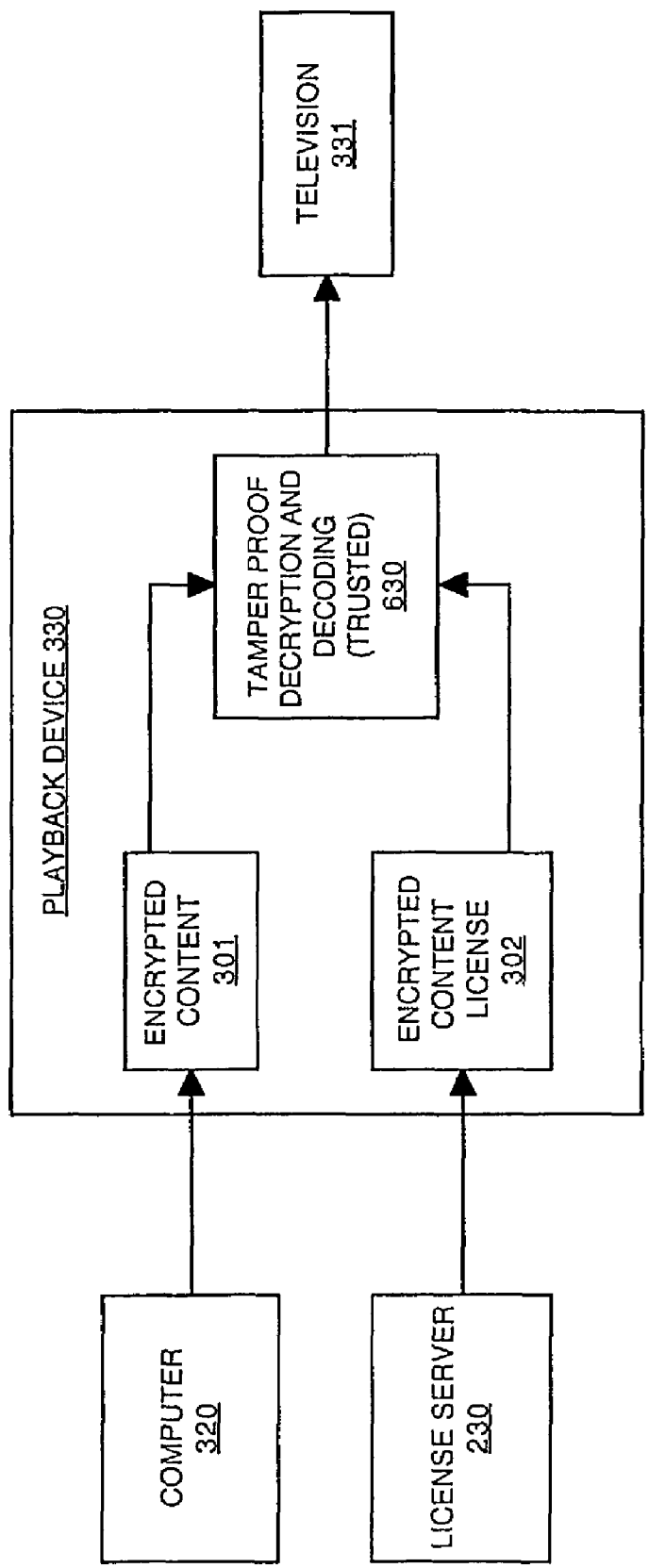
FIG. 6 is a diagram showing one embodiment of a playback device.

To reduce the possibility for unauthorized copying of digital content at the end users' premises, it is important that the area in which the digital content is decrypted inside the playback device is substantially inaccessible to the end user. Ideally, decrypted digital content is not accessible outside of the playback device itself. FIG. 6 is a diagram showing one embodiment of a playback device in accordance with embodiments of the present invention. In FIG. 6, encrypted content 301 is received from computer 320 (e.g., via a home network coupled with home gateway 310). An encrypted copy of content license 302 is obtained from license server 230. The encrypted copy of content license 302 also contains the key sequence needed to decrypt content 610.

In the embodiment of FIG. 6, a tamper detection circuit is utilized that detects an attempts to tamper or in some way access the decryption and decoding hardware (e.g., component 630 of FIG. 6). In one embodiment, if the tamper detection circuit detects tampering, it causes playback device 330 to become un-trusted by content provider 101. For example, a signal can be sent to content provider 101 or to certificate authority 360 indicating that the playback device has been tampered with. Content provider 101 can then refuse to grant a license for digital content to playback device 330.

Figure 7:
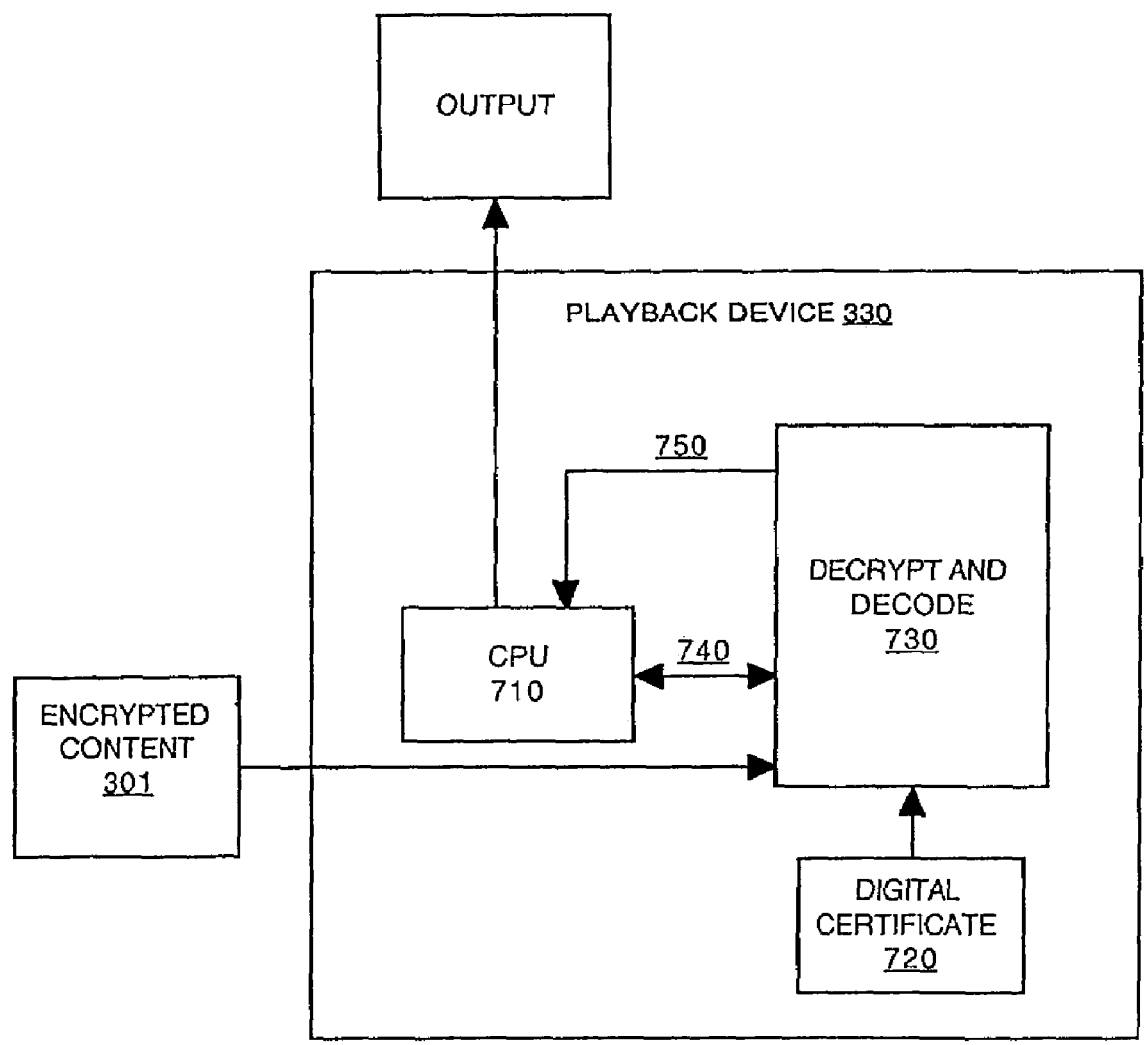
FIG. 7 is a diagram showing another embodiment of a playback device.

FIG. 7 is a diagram showing another embodiment of a playback device. In FIG. 7, CPU 710 is coupled with decrypt and decode component 730 via PCI bus 740. Encrypted content 301 is input directly into component 730 and the decoded and decrypted analog signal is sent to CPU 710 via bus 750. This prevents obtaining a decrypted copy of the digital content by sampling the signal on PCI bus 740.

Figure 8:
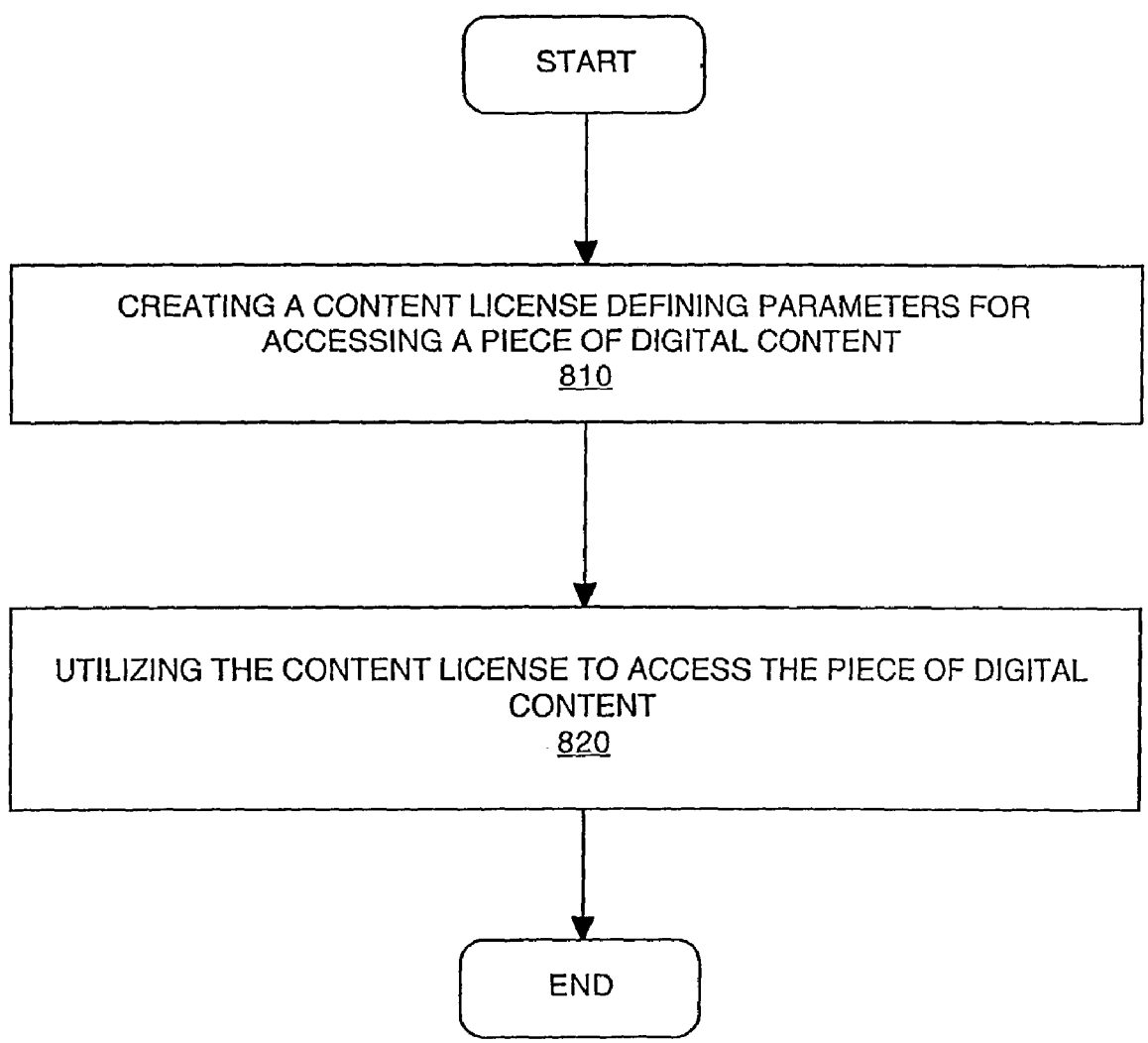
FIG. 8 is a flowchart of a method for implementing digital rights management in accordance with embodiments of the present invention.

FIG. 8 is a flowchart of a method 800 for implementing digital rights management in accordance with embodiments of the present invention. In step 810, a content license is created defining parameters for accessing a piece of digital content. In one embodiment of the present invention, a first logical expression in the content license defines a plurality of playback devices that a recipient of the piece of digital content is authorized to use when accessing the piece of digital content. As described above, the present invention uses an SID to uniquely identify each playback device authorized to access a piece of digital content. Additionally, embodiments of the present invention utilize a certificate authority to verify the identity of each playback device to be included in the content license. Thus, embodiments of the present invention facilitate protecting the content provider's copyright privileges by making it easier to identify a particular playback device that is allowed access to a piece of digital content.

As described above, using a logical expression to define access parameters facilitates greater flexibility than conventional XRML statements because a single content license can allow multiple playback devices to access a single piece of digital content and at multiple time periods. This is convenient to end users who were previously required to obtain multiple content licenses if they wanted to play the piece of digital content on more than one playback device. Additionally, the end users had to determine which content license was valid for the particular playback device they were using to view the piece of digital content. Using the present invention, a user can obtain a single content license that allows utilizing a plurality of authorized playback devices to view a piece of digital content. Additionally, the end user is not forced to determine which content license is valid for a particular playback device.

In the embodiment of method 800, a second logical expression in the content license defines a time interval wherein the plurality of playback devices are authorized to access the piece of digital content. Additionally, the second logical expression may define a plurality of time intervals in which the plurality of playback devices are authorized to access the piece of digital content. This may also comprise defining a separate time interval for accessing the piece of digital content to a particular playback device. As described above, using a logical expression facilitates including multiple playback devices and/or multiple time intervals for accessing a piece of digital content into a single content license. Using conventional digital rights management methods, a content license describes a single pieces of digital content, that can only be accessed by a particular playback device within a particular time interval.

In step 820 of FIG. 8, the content license is utilized to access the piece of digital content. When a user attempts to access a piece of digital content, the playback device obtains a copy of the content license. The content license also comprises the sequence of keys used to encrypt the digital content. This sequence is further encrypted using the public key of the playback device. The encrypted key sequence is decrypted using the private key of the playback device and is used by the playback device to decrypt the digital content.

Figure 9:
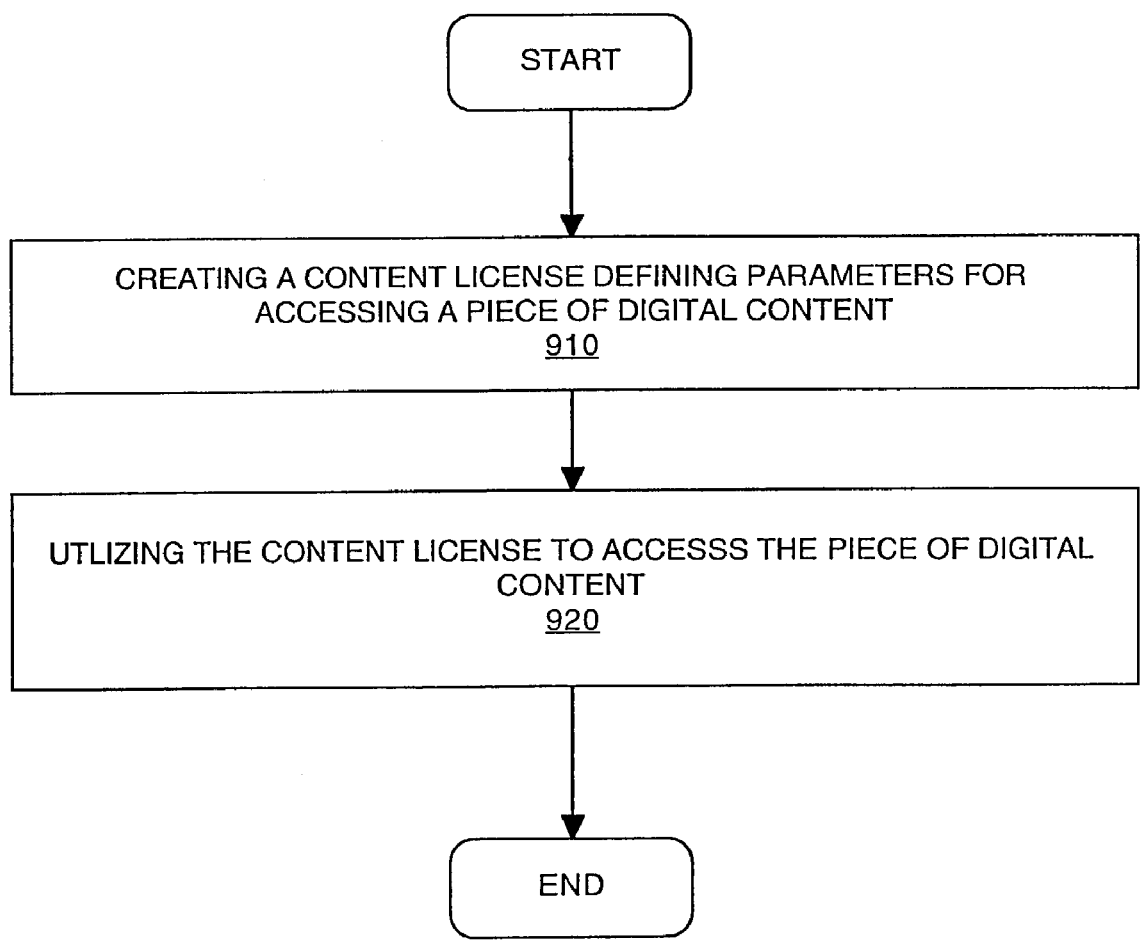
FIG. 9 is a flowchart of a method for implementing digital rights management in accordance with embodiments of the present invention.

FIG. 9 is a flowchart of a method 900 for implementing digital rights management in accordance with embodiments of the present invention. In step 910 of FIG. 9, a content license defining parameters for accessing a piece of digital content is created. In the embodiment of method 900, a first logical expression defines a plurality of time intervals wherein a recipient of a piece of digital content is authorized to access a piece of digital content. As described above, using a logical expression facilitates greater flexibility in defining access parameters to the digital content than is possible using conventional XRML statements because a single content license can be used to define multiple time intervals when a piece of digital content can be accessed. In a conventional digital rights content license, a single time interval is defined for accessing a piece of digital content. This is due to the limitations imposed by using a declarative language (e.g., XRML) to define access parameters. The present invention utilizes logical expressions (e.g., Boolean statements) to define access parameters which facilitates incorporating decision making steps into the process of determining digital rights.

A second logical expression in the content license defines at least one playback device authorized to access the piece of digital content during the time intervals defined in the first logical expression. In the embodiment of method 900, a certificate authority is used to verify the identity of the playback device defined in the content license. Thus, embodiments of the present invention facilitate protecting the content provider's copyright by making it easier to identify a particular playback device that is allowed access to a piece of digital content. Additionally, the playback device is identified using an identification unique to the device (e.g., a SID) to prevent unauthorized access to the piece of digital content. Additionally, the second logical expression may define a plurality of playback devices authorized to access the piece of digital content during the time intervals defined in the first logical expression of the content license.

In step 920 of FIG. 9, the content license is utilized to access the piece of digital content. As described above, when a user attempts to access a piece of digital content, the playback device obtains a copy of the content license. The content license also comprises the sequence of keys used to encrypt the digital content. This sequence is further encrypted using the public key of the playback device. The encrypted key sequence is decrypted using the private key of the playback device and is used by the playback device to decrypt the digital content.

Figure 10:
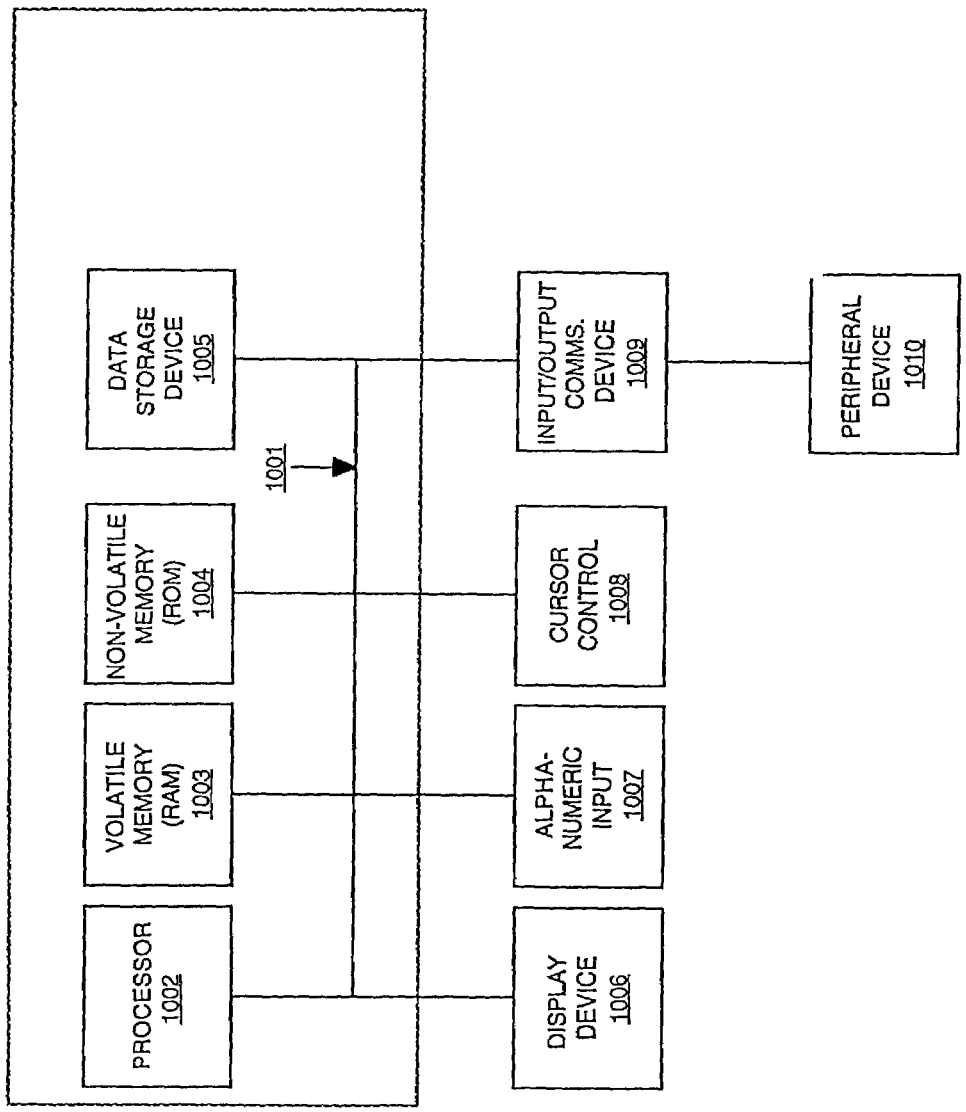
FIG. 10 is a flowchart of a method for implementing digital rights management in accordance with embodiments of the present invention.

With reference to FIG. 10, portions of the present invention are comprised of computer-readable and computer-executable instructions that reside, for example, in computer system 1000 which is used as a part of a computer network. It is appreciated that computer system 1000 of FIG. 10 is exemplary only and that the present invention can operate within a number of different computer systems including general-purpose computer systems, embedded computer systems, laptop computer systems, hand-held computer systems, and stand-alone computer systems.

In the present embodiment, computer system 1000 includes an address/data bus 1001 for conveying digital information between the various components, a central processor unit (CPU) 1002 for processing the digital information and instructions, a volatile main memory 1003 comprised of volatile random access memory (RAM) for storing the digital information and instructions, and a non-volatile read only memory (ROM) 1004 for storing information and instructions of a more permanent nature. In addition, computer system 1000 may also include a data storage device 1005 (e.g., a magnetic, optical, floppy, or tape drive or the like) for storing vast amounts of data. It should be noted that a software program for implementing digital rights management of the present invention can be stored either in volatile memory 1003, data storage device 1005, or in an external storage device (not shown).

Devices which are optionally coupled to computer system 1000 include a display device 1006 for displaying information to a computer user, an alpha-numeric input device 1007 (e.g., a keyboard), and a cursor control device 1008 (e.g., mouse, trackball, light pen, etc.) for inputting data, selections, updates, etc. Computer system 1000 can also include a mechanism for emitting an audible signal (not shown).

Returning still to FIG. 10, optional display device 1006 of FIG. 10 may be a liquid crystal device, cathode ray tube, or other display device suitable for creating graphic images and alpha-numeric characters recognizable to a user. Optional cursor control device 1008 allows the computer user to dynamically signal the two dimensional movement of a visible symbol (cursor) on a display screen of display device 1006. Many implementations of cursor control device 1008 are known in the art including a trackball, mouse, touch pad, joystick, or special keys on alpha-numeric input 1007 capable of signaling movement of a given direction or manner displacement. Alternatively, it will be appreciated that a cursor can be directed an/or activated via input from alpha-numeric input 1007 using special keys and key sequence commands. Alternatively, the cursor may be directed and/or activated via input from a number of specially adapted cursor directing devices.

Furthermore, computer system 1000 can include an input/output (I/O) signal unit (e.g., interface) 1009 for interfacing with a peripheral device 1010 (e.g., a computer network, modem, mass storage device, etc.). Accordingly, computer system 1000 may be coupled in a network, such as the Internet or a client/server environment, whereby a number of clients (e.g., personal computers, workstations, portable computers, minicomputers, terminals, etc.) are used to run processes for performing desired tasks (e.g., "creating," "delivering," "verifying," "dividing," "encrypting," "including," "identifying," "using," etc.). In particular, computer system 1000 can be coupled in a system for implementing digital rights management.

Figure 11:
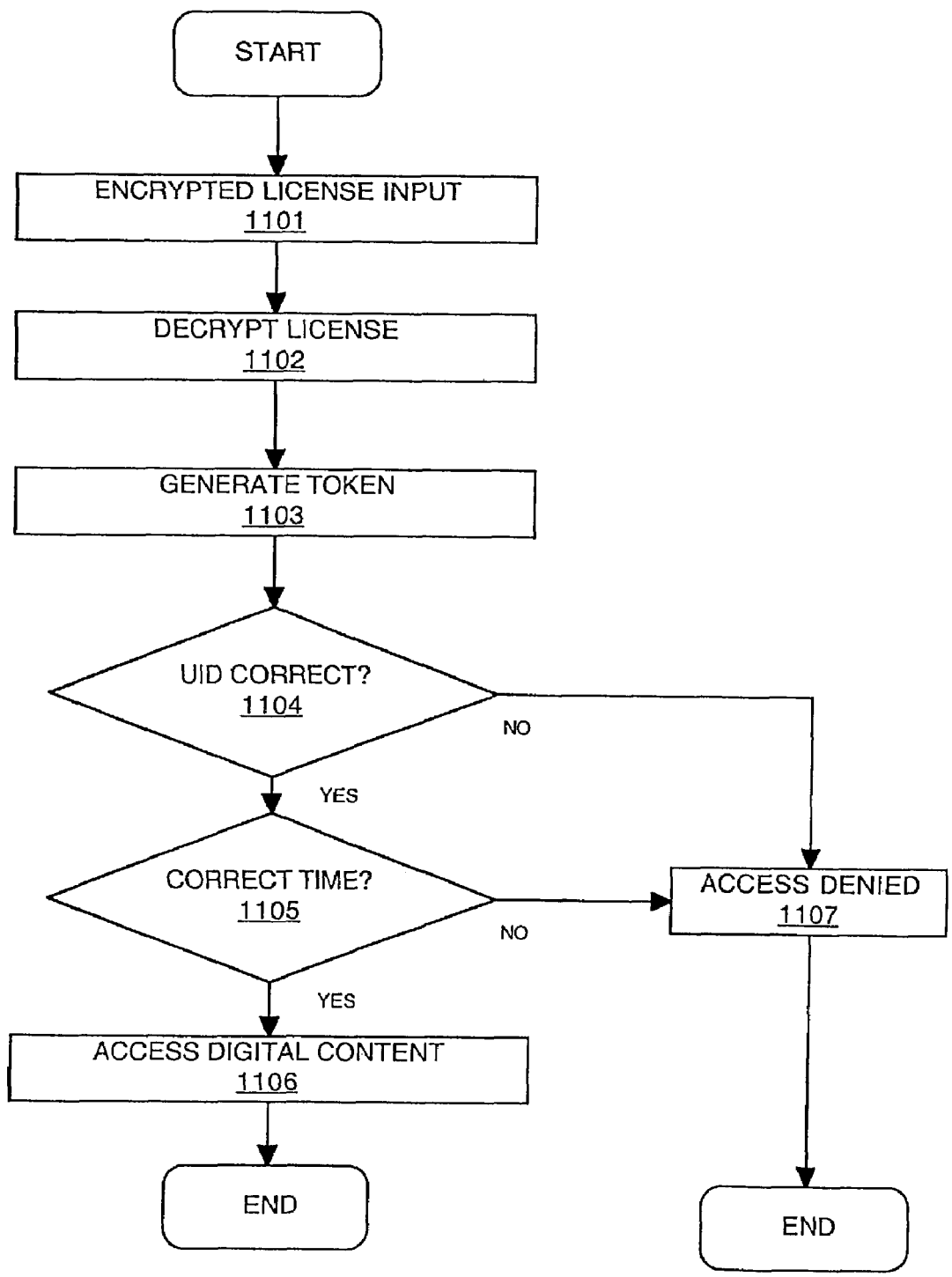
FIG. 11 is a flowchart of an exemplary parser process used in embodiments of the present invention.

FIG. 11 is a flowchart of an exemplary parser process 1100 used in embodiments of the present invention. The parser process of FIG. 11 may be implemented upon the playback devices used to access digital content (e.g., playback device 330 and playback device 340 of FIG. 3) in the present invention. In step 1101 of FIG. 11, the encrypted license is input. In the embodiment of FIG. 11, content license 302 is obtained by, for example, playback device 330 when a user attempts to access a piece of digital content stored upon computer 320.

In step 1102 of FIG. 11, the content license is decrypted. Using its private key, playback device 330 decrypts content license 302. In one embodiment of the present invention, content license 302 may comprise a first logical expression defining a plurality of playback devices that a user can use to access a piece of digital content. A second logical expression in content license 302 defines a time interval wherein the plurality of playback devices are authorized to access the piece of digital content. In another embodiment of the present invention, content license 302 comprises a first logical expression defining a plurality of time intervals wherein the user can access a piece of digital content and a second logical expression defining at least one playback device authorized to access the piece of digital content during one of the time intervals.

In step 1103 of FIG. 11, a token is generated. Session tokens may be generated by playback device 330 to manage access to the piece of digital content stored upon computer 320. The information in the token describes validity periods for accessing the digital content by playback device 330.

In step 1104 of FIG. 11, a logical operation is performed to determine whether the UID in content license 302 describes the playback device performing the parsing process. If the UID of the playback device matches the UID described in content license 302, flowchart 1100 proceeds to step 1105. If the UID of the playback device does not match the UID described in content license 302, flowchart 1100 proceeds to step 1107.

In step 1105 of FIG. 11, a logical operation is performed to determine whether the current time is a valid time interval for playback device 330 to access the piece of digital content. The current time is compared with the parameters in content license 302 describing when playback device 330 can access the digital content. In embodiments of the present invention, the current time is occasionally updated from a trusted source such as content provider 101 or certificate authority 360. If the current time falls within the time interval parameters in content license 302, flowchart 1100 proceeds to step 1106. If the current time is not within the time interval parameters of content license 302, flowchart 1100 proceeds to step 1107.

In step 1106 of FIG. 11, the digital content stored upon computer 320 is accessed by playback device 330. Because the parameters defining access rights to the digital content have been met, the user can use playback device 330 to access the digital content.

In step 1107 of FIG. 11, access to the digital content is denied. Because the parameters for accessing the digital content stored upon computer 320 have not been met, playback device 330 can not be used to access the digital content.

The preferred embodiment of the present invention, a method and system for implementing digital rights management, is thus described. While the present invention has been described in particular embodiments, it should be appreciated that the present invention should not be construed as limited by such embodiments, but rather construed according to the following claims.

What is claimed is:

1. A method for implementing digital rights management comprising:
    creating a content license defining the parameters for accessing a piece of digital content and comprising:
    a logical expression defining a plurality of playback devices, each of the plurality of playback devices with a unique identification, and wherein said logical expression includes said unique identification of each of the plurality of playback devices that a recipient of the piece of digital content is authorized to use when accessing the piece of digital content in said content license and defining a time interval wherein the plurality of playback devices are authorized to access the piece of digital content; and
    utilizing said content license to access the piece of digital content.

2. The method as recited in claim 1, wherein said logical expression comprises a plurality of mathematical expressions and comprising:
    using said plurality of mathematical expressions to define the parameters for accessing the piece of digital content.

3. The method as recited in claim 1, wherein said logical expression comprises a Boolean expression.

4. The method as recited in claim 1, wherein said logical expression comprises a mathematical operator and a Boolean operator.

5. The method as recited in claim 1, wherein said logical expression is created using a set theory expression.

6. The method as recited in claim 1 further comprising:
    using a digital certificate that is compliant with the X.509 standard to verify the identity of the recipient of the piece of digital content.

7. The method as recited in claim 1 further comprising:
    verifying each of the plurality of playback devices separately using a plurality of digital certificates.

8. The method as recited in claim 7, wherein the plurality of digital certificates are compliant with the X.509 standard and comprising:
    verifying each of the plurality of playback devices separately using the plurality of digital certificates.

9. A method for implementing digital rights management comprising:
    creating a content license defining the parameters for accessing a piece of digital content and comprising;
    identifying at least one playback device with a unique identification;
    a logical expression defining a plurality of time intervals wherein a recipient of the piece of digital content is authorized to access the piece of digital content and capable of defining a plurality of playback devices authorized to access said piece of digital content during said plurality of time intervals, wherein the logical expression includes the unique identification of at least one playback device in said content license; and
    utilizing said content license to access the piece of digital content.

10. The method as recited in claim 9, wherein said logical expression comprises a plurality of mathematical expressions and comprising:
    using said plurality of mathematical expressions to define the parameters for accessing the piece of digital content.

11. The method as recited in claim 9, wherein said logical expression comprises a Boolean expression.

12. The method as recited in claim 9, wherein said logical expression comprises a mathematical operator and a Boolean operator.

13. The method as recited in claim 9, wherein said logical expression is created using a set theory expression.

14. The method as recited in claim 9 further comprising:
    verifying the at least one playback device using a digital certificate that is compliant with the X.509 standard.

15. The method as recited in claim 14 wherein said plurality of playback devices are authorized to access the piece of digital content during the plurality of time intervals and comprising:
    verifying each of the plurality of playback devices separately using a plurality of digital certificates that are compliant with the X.509 standard.

16. A computer system comprising:
    a bus;
    a memory unit coupled with said bus; and
    a processor coupled with said bus, said processor for executing a method for implementing digital rights management comprising:
    a) creating a content license defining the parameters for accessing a piece of digital content wherein a logical expression defines a plurality of playback devices, wherein each of the plurality of playback devices is identified with a unique identification that a recipient of the piece of digital content is authorized to use when accessing the piece of digital content and defines a time interval wherein the plurality of playback devices are authorized to access the piece of digital content; and b) delivering said content license to one the plurality of playback devices.

17. The computer system of claim 16, wherein said logical expression comprises a plurality of time intervals wherein the plurality of playback devices are authorized to access the piece of digital content.

18. The computer system of claim 16, wherein said logical expression comprises a plurality of mathematical expressions.

19. The computer system of claim 16, wherein said logical expression comprises a plurality of Boolean expressions.

20. The computer system of claim 16, wherein said logical expression is created using a set theory expression.

21. The computer system of claim 16, wherein said logical expression comprises a mathematical operator and a Boolean operator.

22. The computer system of claim 16, wherein the identity of the recipient is verified using a digital certificate is compliant with the X.509 standard.

23. The computer system of claim 16, wherein each of the plurality of playback devices separately verified using a plurality of digital certificates.

24. The computer system of claim 23, wherein the plurality of digital certificates are compliant with the X.509 standard.

25. The computer system of claim 16, wherein the unique identification of each of the plurality of playback devices authorized to access the piece of digital content is included in said content license.

* * * * *